Figure 1:
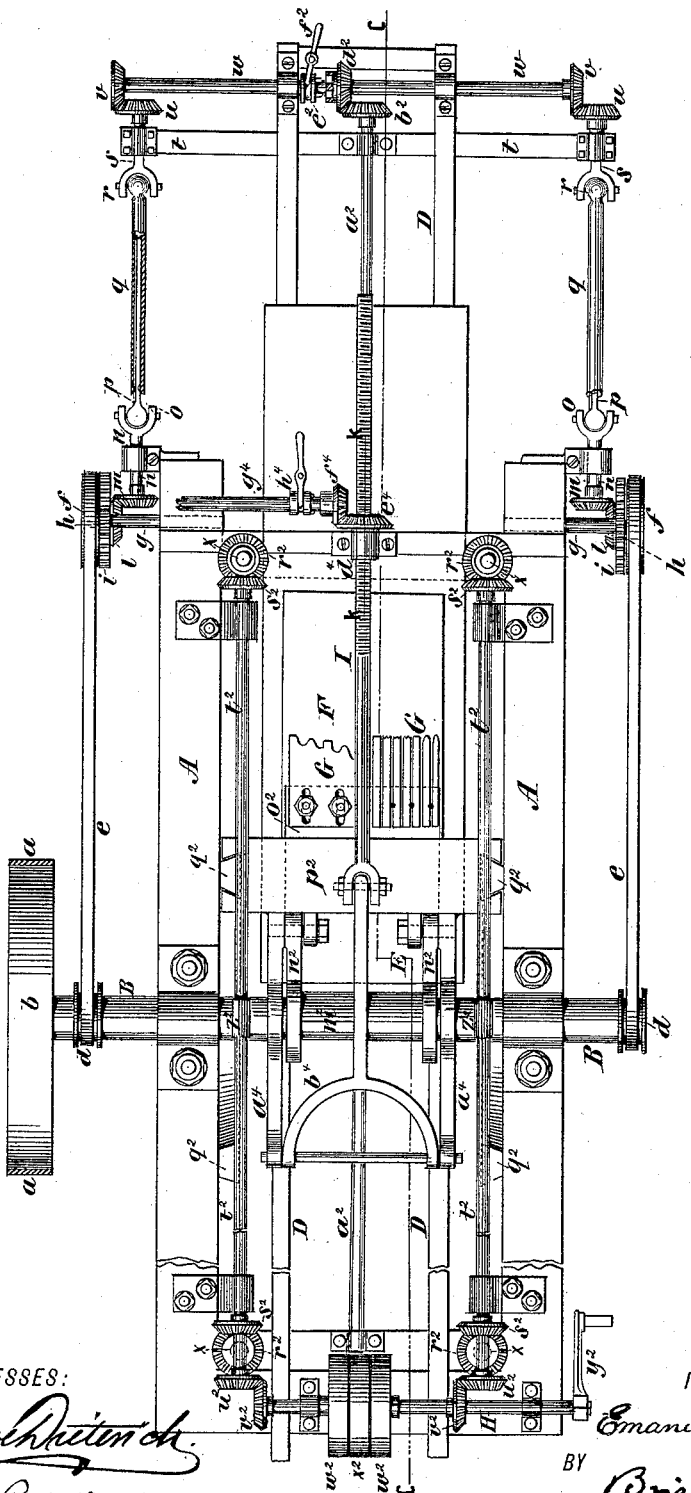

(No Model.) 2 Sheets—Sheet 1.

E. FOERSTER.
STONE CUTTING MACHINE.

No. 392,601. Patented Nov. 13, 1888.

WITNESSES:
Gustav Dieterich
T. F. Bourne

INVENTOR,
Emanuel Foerster,
BY Briesen & Steele
ATTORNEYS.

(No Model.) 2 Sheets—Sheet 2.
E. FOERSTER.
STONE CUTTING MACHINE.
No. 392,601. Patented Nov. 13, 1888.
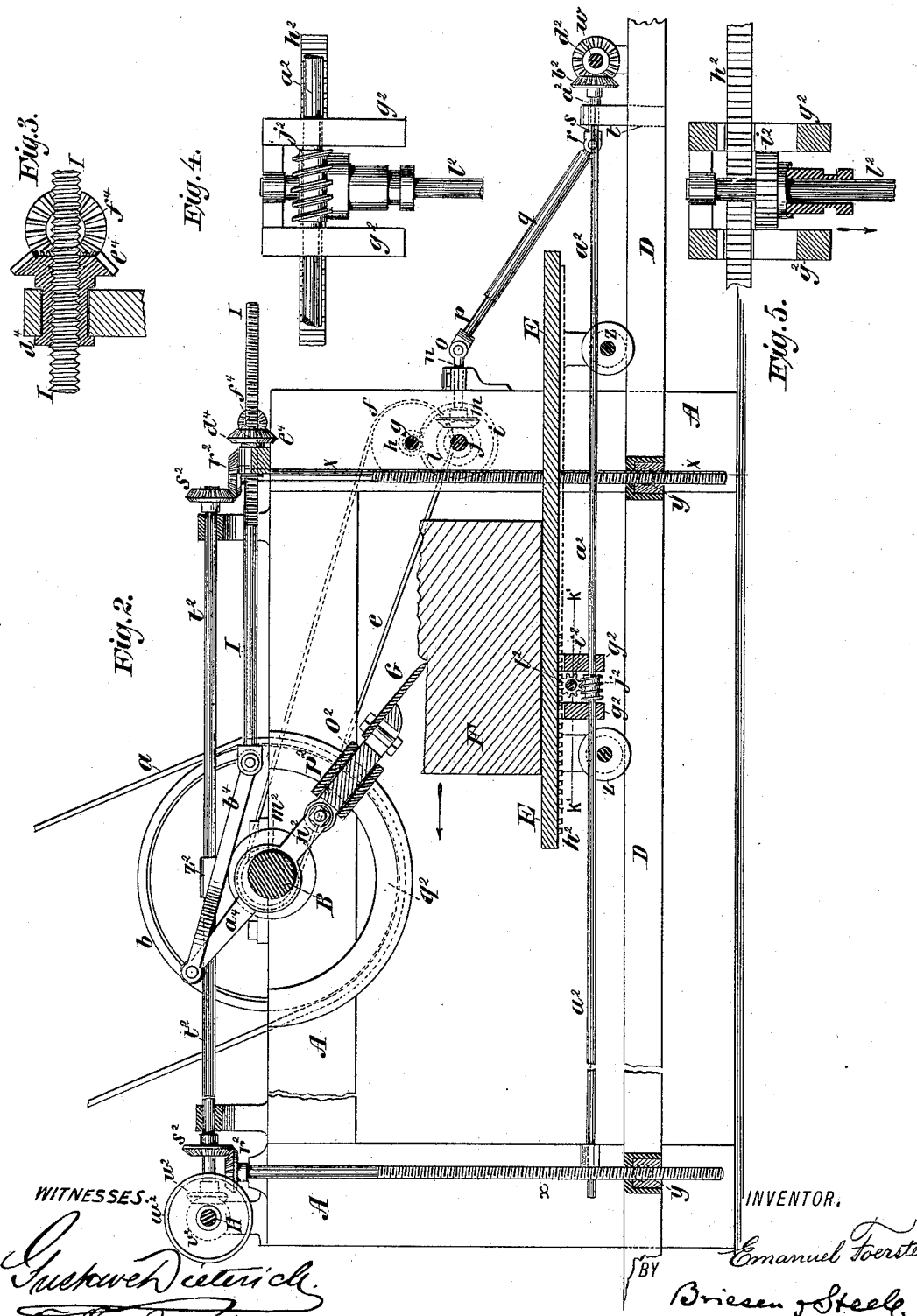
WITNESSES:
Gustav Dieterich
F. F. Bourne
INVENTOR:
Emanuel Foerster
BY Briesen & Steele
ATTORNEYS.

UNITED STATES PATENT OFFICE.

EMANUEL FOERSTER, OF NEW YORK, N. Y.

STONE-CUTTING MACHINE.

SPECIFICATION forming part of Letters Patent No. 392,601, dated November 13, 1888.

Application filed November 25, 1887. Serial No. 256,059. (No model.)

*To all whom it may concern:*

Be it known that I, EMANUEL FOERSTER, of New York city, New York county, New York, have invented an Improved Stone-Cutting Machine, of which the following is a specification.

The object of my invention is to provide a machine for cutting moldings, arches, and other designs on stone with rapidity and accuracy.

The invention consists in the novel arrangement and combination of parts, that will be more fully hereinafter set forth.

Reference is to be had to the accompanying drawings, forming part of this specification, in which—

Figure 1 is a partly broken plan view of a stone-cutting machine constructed according to my invention. Fig. 2 is a vertical longitudinal section on the line $c\ c$, Fig. 1. Fig. 3 is a section on the line $k\ k$, Fig. 1. Fig. 4 is a detail view, looking from the under side, of the gear for moving the stone-carrying table or carriage; and Fig. 5 is a section on the line $k'\ k'$, Fig. 2, looking from the under side of the gear.

In the accompanying drawings, A represents a frame of suitable construction. Journaled in suitable bearings in the upper part of the frame A is a horizontal shaft, B. The shaft B may be driven by suitable means, preferably by a belt, $a$, actuated by a suitable motor, said belt passing over a pulley, $b$, carried by said shaft. The shaft B also carries pulleys $d\ d$, that are connected by belts $e\ e$ with pulleys $f\ f$ on the ends of studs or shafts $g$, suitably carried by the frame A. The shafts $g$ carry pinions $h$, which gear with spur-wheels $i$, carried at the ends of studs or shafts $j$, supported by the frame A. (See Fig. 2.) The studs or shafts $j$ also carry bevel gear-wheels $l$, which mesh with similar gear-wheels, $m$, on the ends of short shafts $n$, journaled in suitable bearings in the frame A. The opposite ends of the shafts $n$ are pivotally connected, preferably by universal joints $o$, with the ends of rods $p$. The rods $p$ pass within hollow rods or tubes $q$, which are pivotally connected at one end, preferably by universal joints $r$, with short rods or shafts $s$, journaled in supports or extensions $t$, carried by a frame or table, D, which passes longitudinally through the frame A. On their outer or opposite ends the shafts $s$ carry bevel gear-wheels $u$, which mesh with similar gear-wheels, $v$, on a horizontal shaft, $w$, suitably journaled on the frame D.

The frame D is supported in the frame A, and is adapted to be raised and lowered therein by means of vertical screw-rods $x$, that are journaled at their upper ends in bearings in the upper part of the frame A, and which rods $x$ pass through nuts $y$, that are pivotally carried by the frame D.

The frame D supports a stone-carriage, E, which runs by means of rollers $z$ upon the longitudinal rails composing said frame. $a^2$ is a shaft supported in bearings on the frame D, and it gears by means of a bevel gear-wheel, $b^2$, carried on its end, with a similar wheel, $d^2$, carried loosely on the shaft $w$. The wheel $d^2$ may be caused to rotate with the shaft $w$ by means of a clutch, $e^2$, on the shaft $w$, which is adapted to engage and lock with the wheel $d^2$. The clutch $e^2$ may be thrown in and out of gear with the wheel $d^2$ by means of a lever, $f^2$, or by other suitable means. The opposite part of the shaft $a^2$ passes freely through bearings $g^2$ on the stone-carriage E. The carriage E carries a rack, $h^2$, which gears by means of an intermediate pulley, $i^2$, supported by the carriage E, with a worm-sleeve, $j^2$, carried by the shaft $a^2$ between the bearings $g^2$, as shown. By means of a groove and feather or by other suitable means the worm-sleeve $j^2$ is rotated by the shaft $a^2$, and is also permitted longitudinal movement on said shaft. By rotating the shaft $a^2$ by means of the gearing described the stone-carriage E will be moved longitudinally in the desired direction. After the stone-carriage has been advanced by the shaft $a^2$ it is desirable that it be returned to the starting place toward the front of the machine with greater speed than can be done by the gearing described. For this purpose I place the pinion $i^2$ loosely on a shaft, $l^2$, carried by the carriage E. By moving the pinion out of gear with the rack $h^2$ and worm-sleeve $j^2$, as in Fig. 5, the stone-carriage will be free to be moved quickly by any desired means.

F is a stone carried by the carriage E and adapted to be operated upon by the cutting-tool G. The cutting-tool G is arranged and operated as follows: Near the center of the shaft B is secured an eccentric, $m^2$. The eccentric $m^2$ is embraced by rods $n^2$, or, rather, by straps that are carried by said rods. The outer or free ends of said rods $n^2$ are pivotally connected with a sliding plate or bar, $o^2$, which passes freely through a guide-block, $p^2$. (See Fig. 2.) The guide-block $p^2$ is supported and guided at its ends by curved guide-bars $q^2$, carried by the frame A, and which pass into grooves in the ends of the guide-blocks $p^2$. The guide-bars $q^2$ are preferably semicircular in form or like a half-ring, and are supported with their ends up, as shown. The connections between the guide-block $p^2$ and the guide-bars $q^2$ are preferably of dovetail form, as shown.

The cutting-tool G is secured to the sliding plate $o^2$ by suitable means, preferably by bolts, as shown. The cutting-tool G may be of any desired form, and be made of any desired number of separate cutters or of one piece of metal. (See Fig. 1.)

To cut or shape a stone by my improved machine, the stone-carriage E is first advanced toward the front of the machine and the pinion $i^2$ placed in gear with the rack $h^2$ and worm $j^2$. A stone, F, is now placed upon the carriage E, said stone being placed in proximity to the tool G. The main driving-shaft B is now started to rotate by means of the belt $a$ and pulley $b$. As the shaft B rotates, the tool G, by means of the eccentric $m^2$, rods $n^2$, and sliding plate $o^2$, will be reciprocated rapidly. As the tool G is thus reciprocated, the carriage E, and thereby the stone F, will be advanced through the medium of the gearing marked on the drawings in alphabetical order from $d$ to $w$, and the wheels $b^2$ and $d^2$, shaft $a^2$, worm $j^2$, pinion $i^2$, and rack $h^2$. By this means, as the tool G is reciprocated the stone is gradually fed to the tool until the desired outline is produced.

As the stones F may vary in thickness, the frame D, supporting the stone-carriage E, is adapted to be raised and lowered. This is accomplished by means of the vertical screw-rods $x$. At their upper ends the rods $x$ are provided with gear-wheels $r^2$, which mesh with similar wheels, $s^2$, on horizontal shafts $t^2$, supported in suitable bearings at the upper part of the frame A. The shafts $t^2$ also carry gear-wheels $u^2$, which mesh with similar gear-wheels, $v^2$, on a driving-shaft, H, suitably journaled on the frame A. The shaft H may be driven by any suitable means, but preferably by means of fast and loose pulleys $w^2 x^2$, over which pass belts from any suitable motor for turning said shaft H in opposite directions. When it is desired to raise or lower the frame D but little, the shaft H may be turned if preferred, by means of a crank-handle, $y^2$, Fig. 1. By gradually raising or lowering one end of the frame D above the other end while the stone advances arches or other curves may be cut in the stone on my machine. To readily accomplish this, I sever the shafts $t^2$ and connect their severed ends by sliding sleeves $z^2$, grooves and feathers or other suitable connections being provided between the sleeves $z^2$ and shafts $t^2$. By moving back the sleeves $z^2$ the screw-rods $x$ at one end of the frame A only will be turned, whereby only one end of the frame D will be operated. By moving the sleeves $z^2$, so as to connect the severed ends of the shafts $t^2$, both ends of the frame D will be raised or lowered in unison.

Stones, F, of different degrees of hardness should often be approached by the tool G at different angles; also when more or less stone is desired to be removed by the cut of the tool. To permit the tool G to be thus presented to the stone, I secure to the guide-block $p^2$ arms or levers $a^4$, which preferably have their fulcrum on the shaft B. The opposite or free ends of the levers $a^4$ are pivotally connected by means of a forked or other shaped rod $b^4$ with a longitudinally-movable rod or shaft, I, as shown. The shaft I is screw-threaded toward its outer end and passes through a nut or internally-threaded tube, $d^4$, journaled in bearings on the frame A. The tube $d^4$ carries at one end a bevel gear-wheel, $e^4$, which meshes with a similar wheel, $f^4$, loosely carried by a shaft, $g^4$. By means of a clutch, $h^4$, carried by the shaft $g^4$, the wheel $f^4$ may be caused to rotate to turn the nut or tube $d^4$, and thereby move the shaft I. The shaft $g^4$ is suitably hung in the frame A, and may be revolved, when desired, by any suitable means. (Not shown.) By rotating the nut $d^4$, and thereby moving the shaft I either back or forward, the tool G will be raised or lowered to approach the stone at the desired angle, as before stated. When the stone F has been advanced in the direction of the arrow in Fig. 2, and the desired cut has been made nearly to the end of the stone, there may be danger, especially with soft stones, that the end portion of the stone at the cut be broken off by the tool. To prevent this and to finish the cut in the stone, the tool G is raised by moving back the shaft I. The carriage E and thereby the stone are moved to the back of the machine in the direction of the arrow, Fig. 2. The shaft I is then advanced toward the front of the machine, whereby the tool G will be swung backward and against the end of the stone that was left uncut. By now advancing the carriage and thereby the stone toward the tool G the uncut part of the stone may be finished without danger of its being broken off, as the cutting is finished from the opposite direction.

With machines of this construction perfectly flat surfaces, moldings, pillars, &c., may be cut by merely changing the cutting-tool G. These tools G may have any desired shaped cutting-edge. In Fig. 1 is shown one form of tool by which a wide and ornamental cut is made; but cutters G may be of any desired width.

If preferred, the shaft $a^2$, instead of carrying a worm-sleeve, $j^2$, as shown, could be made in the form of a continuous worm-shaft, suitably supported.

Whether the frame D is raised or lowered, the shaft $a^2$ may still be driven by the connecting-gearing. This is permitted by the use of the rods $p$ and hollow rods $q$, which receive said rods, the rods $p$ and $q$ sliding upon each other, by which means the pivoted ends of the rods $q$ are always in a plane with reference to the pivot $o$ on the rod $p$.

Although I have shown in the drawings a double set of gearing—that is, one set on each side of the machine for driving the shaft $a^2$—it is evident that only one set may be used. By using the double set, as shown, less strain is placed upon the several parts.

Having now described my invention, what I claim is—

1. In a stone-cutting machine, the combination of the main frame A, vertically-movable frame D, supported in said frame A, stone-carriage E on said frame D, and means, substantially as described, for driving said carriage E horizontally when at different distances from the ground, substantially as specified.

2. In a stone-cutting machine, the combination of the main frame A, vertically-movable frame D, supported in said frame A, means, substantially as described, for raising and lowering said frame D, carriage E, supported by said frame D, and means, substantially as described, for driving the carriage E, substantially as specified.

3. In a stone-cutting machine, the combination of the frame A, driving-shaft B, shaft $j$, driven from the shaft B, shaft $n$, gear-wheels connecting the shafts $j$ and $n$, rod $p$, pivoted to the shaft $n$, hollow rod $q$, embracing the rod $p$, shaft $s$, pivoted to the rod $q$, shaft $w$, gear-wheels connecting the shafts $s$ and $w$, movable frame D, supported by the frame A, said frame D supporting the shafts $s$ and $w$, shaft $a^2$, gear-wheels connecting the shafts $a^2$ and $w$, stone-carriage E, and means, substantially as described, for driving the carriage E by the shaft $a^2$, all arranged and operating substantially as set forth.

4. In a stone-cutting machine, the frame A and driving-shaft B, in combination with the sliding tool-carrying plate $o^2$, guide $p^2$, for the tool-carrying plate, and curved guides $q^2$, for the guides $p^2$, whereby the tool-plate $o^2$ may be turned and guided in the arc of a circle to present the tool to the stone at varying angles, and means, substantially as described, for reciprocating the tool-plate $o^2$ from the shaft B, as specified.

5. The tool-carrying plate $o^2$, means, substantially as described, for reciprocating said tool-plate, guide $p^2$, within which the tool-plate $o^2$ slides, curved guide-bars $q^2$, supporting the guides $p^2$ and around which the guide $p^2$ is adapted to move, and pivoted levers $a^4$, secured to the guide $p^2$ on one side of the shaft B and extending also on the opposite side thereof, in combination with the screw-rod I, connected with the free ends of the levers $a^4$, and means, substantially as described, for moving said rod I longitudinally, whereby the tool-plate $o^2$ may be raised and lowered and the tool presented to the stone at different angles, as specified.

6. The tool-carrying plate $o^2$ and means, substantially as described, for reciprocating it, and guides $p^2$ and curved bars $q^2$, in combination with the stone-carriage E and means for raising and lowering and for driving said carriage, whereby the stone may be brought up to the tool and then advanced against the tool, as herein shown and described.

7. The tool-carrying plate $o^2$ and means, substantially as described, for guiding and reciprocating it, in combination with the vertically-movable frame D and means for raising and lowering it, stone-carriage E, supported by said vertically-movable frame D, and with means, substantially as described, for driving said carriage E longitudinally along said frame, substantially as herein shown and described.

8. The tool-carrying-plate $o^2$ and means, substantially as described, for reciprocating it and for adjusting it to present the tool at different angles and in different directions to the stone, in combination with the vertically-movable frame D, stone-carriage E, supported by said frame D, and with means, substantially as described, for moving the carriage E, to feed the stone to the tool, as herein shown and described.

9. The combination of a sliding tool-carrier and a movable guide for said tool-carrier, whereby the tool may be presented to the stone at varying angles with an eccentric $m^2$, its driving-shaft B and rods $n^2$ and $a^4$, substantially as herein shown and described.

10. The main frame A, screw-rods $x$, carried thereby, and means, substantially as described, for turning said rods, in combination with the vertically-movable frame D and nuts $y$, which are pivoted and free to vibrate in the frame D, through which nuts the rods $x$ pass, whereby both ends of the frame D may be elevated in unison or one end at a time, thereby slanting said frame, all arranged for operation substantially as specified.

11. The frame A, shaft $j$, carried thereby, and means, substantially as described, for driving said shaft, in combination with the vertically-movable frame D, shaft $a^2$, carried thereby, and with the universal and sliding joint-connection, substantially as herein shown, between the shaft $j$ and the shaft $a^2$, whereby the shaft $a^2$ may be driven from the shaft $j$ when said shafts are at different distances apart, as specified.

EMANUEL FOERSTER.

Witnesses:
T. F. BOURNE,
HARRY M. TURK.